United States Patent
Rauma et al.

(10) Patent No.: US 10,850,628 B2
(45) Date of Patent: Dec. 1, 2020

(54) ELECTRIC POWER SYSTEM FOR SUPPLYING ELECTRIC ENERGY TO A VESSEL

(71) Applicant: Visedo Oy, Lappeenranta (FI)

(72) Inventors: Kimmo Rauma, Lappeenranta (FI); Tero Jarvelainen, Lappeenranta (FI); Heikki Bergman, Sipoo (FI)

(73) Assignee: DANFOSS EDITRON OY, Lappeenranta (FI)

( * ) Notice: Subject to any disclaimer, the term of this patent is extended or adjusted under 35 U.S.C. 154(b) by 322 days.

(21) Appl. No.: 15/478,646

(22) Filed: Apr. 4, 2017

(65) Prior Publication Data

US 2017/0282730 A1 Oct. 5, 2017

(30) Foreign Application Priority Data

Apr. 5, 2016 (EP) ..................................... 16163770

(51) Int. Cl.
*B60L 1/00* (2006.01)
*B60L 3/00* (2019.01)
(Continued)

(52) U.S. Cl.
CPC ........... *B60L 53/14* (2019.02); *B60L 11/1824* (2013.01); *B60L 53/20* (2019.02); *B60L 53/31* (2019.02);
(Continued)

(58) Field of Classification Search
CPC ...... B60L 11/1824; B60L 53/14; B60L 53/20; B60L 53/30; B60L 53/31; B60L 53/60;
(Continued)

(56) References Cited

U.S. PATENT DOCUMENTS

2012/0032519 A1* 2/2012 Watts ........................ H02J 3/46
307/99
2012/0309242 A1 12/2012 Haugland
(Continued)

FOREIGN PATENT DOCUMENTS

DE 10 2006 024594 A1 11/2007
EP 2 458 724 A1 5/2012
(Continued)

OTHER PUBLICATIONS

EP Search Report, dated Sep. 8, 2016, from corresponding EP application.

*Primary Examiner* — Rexford N Barnie
*Assistant Examiner* — Toan T Vu
(74) *Attorney, Agent, or Firm* — Nixon & Vanderhye

(57) ABSTRACT

A power system for supplying electric power from shore-side to a vessel is presented. The power system includes one or more shore-side converters (101-112) for receiving electric power from a shore-side alternating voltage network (137) and for producing one or more direct voltages. Each shore-side converter can be a controllable converter for controlling the produced direct voltage to be suitable for the vessel in accordance with a control signal received from the vessel, or the vessel may include a direct voltage converter for converting the direct voltage received from the shore-side to be suitable for the vessel. The vessel can be an electric vessel which includes a chargeable battery (132) for supplying electric power to the propulsion system (135) of the vessel.

9 Claims, 2 Drawing Sheets

(51) Int. Cl.
  *H02G 3/00* (2006.01)
  *B60L 53/14* (2019.01)
  *H02J 4/00* (2006.01)
  *B60L 53/20* (2019.01)
  *B60L 53/31* (2019.01)
  *B60L 11/18* (2006.01)
  *B63H 21/17* (2006.01)
  *H02J 7/00* (2006.01)
  *B63J 3/02* (2006.01)

(52) U.S. Cl.
  CPC ............... *B63H 21/17* (2013.01); *H02J 4/00* (2013.01); *H02J 7/0013* (2013.01); *B60L 2200/32* (2013.01); *B63J 3/02* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
  CPC ........ B60L 2200/32; B63H 21/17; H02J 4/00; H02J 7/0013; B63J 3/02; Y02T 10/7005; Y02T 10/7088; Y02T 90/121; Y02T 90/127; Y02T 90/128; Y02T 90/14; Y02T 90/163
  USPC ........ 307/9.1, 10.1, 25, 31, 38, 43; 323/207; 320/107–109, 137; 363/15, 51, 57
  See application file for complete search history.

(56) References Cited

U.S. PATENT DOCUMENTS

2014/0077607 A1* 3/2014 Clarke .................. H02J 3/005
  307/75
2016/0268820 A1* 9/2016 Ono ......................... B60L 3/04

FOREIGN PATENT DOCUMENTS

WO  WO-2010091743 A2 * 8/2010 ............ H02J 3/1842
WO  2013/175061 A1  11/2013

\* cited by examiner

ELECTRIC POWER SYSTEM FOR SUPPLYING ELECTRIC ENERGY TO A VESSEL

FIELD OF THE DISCLOSURE

The disclosure relates to an electric power system for supplying electric power from shore-side to a vessel. Furthermore, the disclosure relates to a vessel that can be, for example but not necessarily, a ship, a boat, or a ferry.

BACKGROUND OF THE INVENTION

In many cases there is a need to supply electric power from shore-side to a vessel when the vessel is at a berth. The vessel can be for example an electric vessel that comprises a chargeable battery system and an electric propulsion system energized by the chargeable battery system. It is also possible that the vessel is a conventional combustion engine vessel, and the vessel is connected to a shore-side alternating voltage network instead of using auxiliary generators of the vessel for producing the electricity needed when the vessel is at a berth.

It is not always possible to connect the shore-side alternating voltage network to the on-board alternating voltage network of the vessel as the vessel may use different frequency and/or voltage level than the shore-side alternating voltage network. For example, the frequency of 50 Hz is used in Europe whereas the frequency of 60 Hz is used in North America. In cases where the above-mentioned alternating voltage networks can be connected to each other, a berthing time can relatively long because of the required synchronization and phase-order check between the alternating voltage networks.

Publication WO2007060189 describes a known solution to connect a shore-side alternating voltage network to a vessel. In this solution, a converter is installed on board. The on-board converter is connected to the shore-side alternating voltage network through a cable. The on-board converter is typically a frequency converter for converting the alternating voltage received from the shore-side into alternating voltage having a voltage level and frequency suitable for the alternating voltage network of the vessel. It is also possible that the on-board converter is a rectifier for converting the alternating voltage received from the shore-side into direct voltage having a voltage level suitable for the vessel, e.g. for charging batteries of the vessel. A potential challenge related to this approach is that the input voltage range of the on-board converter may not be enough for voltage levels used in different ports. This situation may occur especially when the vessel sails all over the world.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric power system for supplying one or more direct voltages from shore-side to a vessel that can be for example a ship, a boat, or a ferry.

An electric power system according to the invention comprises:
one or more controllable converters for receiving electric power from a shore-side alternating voltage network and for producing the one or more direct voltages,
electric connectors for connecting to an electric circuitry of the vessel,
one or more direct voltage links for transferring the one or more direct voltages from the one or more controllable converters to the electric connectors, and
a control system configured to receive a control signal from the vessel and to directly control the one or more controllable converters in accordance with the received control signal to control the one or more direct voltages to be transferred from the electric connectors to the electric circuitry of the vessel.

In accordance with the invention, there is provided also a new vessel that comprises:
electric connectors for receiving the above-mentioned one or more direct voltages from the above-mentioned electric power system, and
a transmitter for transmitting, to the above-mentioned electric power system, the above-mentioned control signal so as to enable the electric power system to control the one or more direct voltages to be suitable for the vessel.

The control signal that is communicated from the vessel to the electric power system enables the electric power system to adapt itself in accordance with the needs of the vessel. The control signal can be an analog or digital signal that is transferred from the vessel to the electric power system with the aid of e.g. a radio link, an electric signal cable, or an optical fiber. In an exemplifying case where the control signal is a digital signal, the transfer of the control signal can be carried out in accordance with one or more digital data transfer protocols such as for example the Internet Protocol "IP", the Ethernet protocol, the Asynchronous Transfer Mode "ATM" protocol, and/or the MultiProtocol Label Switching "MPLS". For example, the Internet of Things "IoT" technology can be utilized for arranging the transfer of control signals and possible other data transfer in cases where a port comprises many electric power systems of the kind described above and there are many vessels which simultaneously receive electric power from the electric power systems.

In accordance with the invention, there is provided also a new vessel that comprises:
electric connectors for receiving one or more direct voltages from a shore-side electric power system,
one or more controllable direct voltage converters, and
a control system for controlling the one or more controllable direct voltage converters to convert the one or more direct voltages into one or more direct voltages suitable for the vessel.

Each controllable direct voltage converter, i.e. a controllable DC-DC converter, can be for example a buck and/or boost converter. In many cases, a controllable DC-DC converter can be arranged to support a broad input voltage range more cost effectively than is a case with a controllable rectifier for converting alternating voltage into controllable direct voltage.

A vessel according to an exemplifying and non-limiting embodiment of the invention comprises a chargeable battery system for receiving charging energy from the electric connectors of the vessel and for supplying electric power to the propulsion system of the vessel.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
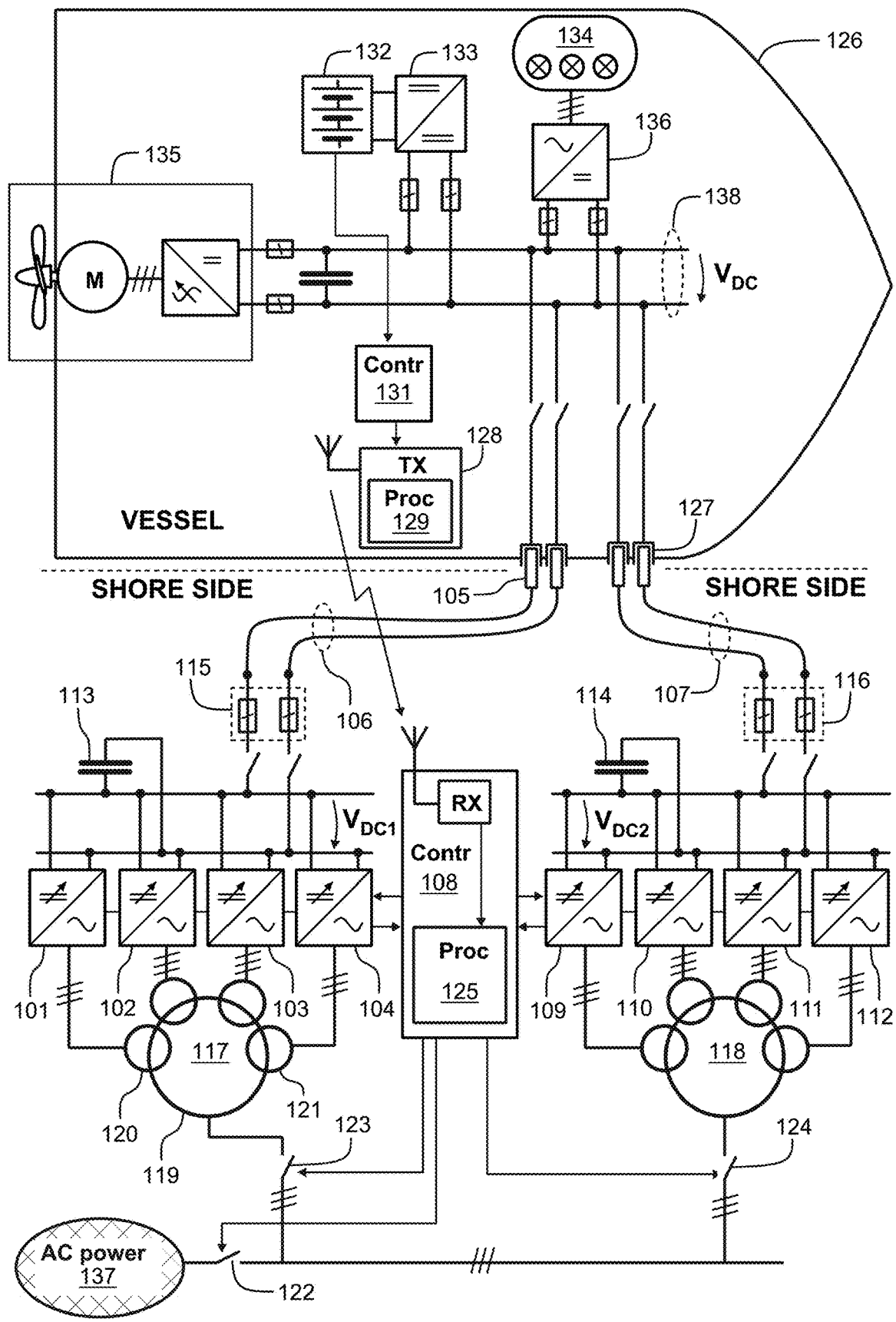
FIG. 1 shows a schematic illustration of an electric power system according to an exemplifying and non-limiting embodiment of the invention and a vessel according to an exemplifying and non-limiting embodiment of the invention.

FIG. 1 shows a schematic illustration of an electric power system according to an exemplifying and non-limiting embodiment of the invention. Furthermore, FIG. 1 shows a schematic illustration of a vessel 126 according to an exemplifying and non-limiting embodiment of the invention. The vessel 126 can be for example a ship, a boat, or a ferry. The electric power system is located on the shore-side and the electric power system is arranged to supply electric power to the vessel 126. The electric power system comprises controllable converters 101, 102, 103, 104, 109, 110, 111, and 112. The controllable converters 101, 102, 103, and 104 are arranged to receive electric energy from a shore-side alternating voltage network 137 and to produce direct voltage $V_{DC1}$. Correspondingly, the controllable converters 109, 110, 111, and 112 are arranged to receive electric energy from the shore-side alternating voltage network 137 and to produce direct voltage $V_{DC2}$. The electric power system comprises electric connectors for connecting to an electric circuitry of the vessel 126. In FIG. 1, one of the electric connectors of the electric power system is denoted with a reference 105. The electric power system comprises direct voltage links 106 and 107 for transferring the direct voltages $V_{DC1}$ and $V_{DC2}$ from the controllable converters 101-104 and 109-112 to the above-mentioned electric connectors. The direct voltage links 106 and 107 may comprise for example bendable cables. The electric power system comprises a control system 108 for receiving a control signal from the vessel 126 and for controlling the controllable converters 101-104 and 109-112 in accordance with the received control signal so as to control the direct voltages $V_{DC1}$ and $V_{DC2}$ to be suitable for the vessel 126. In the exemplifying case illustrated in FIG. 1, there are two groups of controllable converters so that each group comprises four controllable converters. It is however clear to a skilled person that many different system architectures are possible, e.g. there can be only one group or more than two groups and each group may comprise one or more converter devices. A "group" having a single member is understood here as a special case of a group. Furthermore it is possible that different groups have different number of converter devices. In each case, the system architecture may depend on several factors such as e.g. the charge power need, the shore-side alternating voltage network, factors related to cost efficiency, etc.

The vessel 126 comprises electric connectors for receiving the above-mentioned direct voltages $V_{DC1}$ and $V_{DC2}$ from the above-mentioned direct voltage links 106 and 107. In FIG. 1, one of the electric connectors of the vessel 126 is denoted with a reference 127. The vessel 126 comprises a transmitter 128 for transmitting, to the above-mentioned electric power system, the above-mentioned control signal so as to enable the electric power system to control the direct voltages $V_{DC1}$ and $V_{DC2}$ to be suitable for the vessel 126. In this exemplifying case, the vessel 126 is an electric vessel that comprises a chargeable battery system 132 for receiving charging energy from the electric connectors of the vessel and for supplying electric power to a propulsion system 135 of the vessel. The vessel 126 comprises a control system 131 for determining the above-mentioned control signal in accordance with e.g. the state of charge of the chargeable battery system 132 and/or in accordance with other information such as e.g. one or more predetermined control parameters. A control parameter may indicate for example a reference value for direct voltage $V_{DC}$ of a direct voltage link 138 of the vessel 126. In the exemplifying case illustrated in FIG. 1, the vessel comprises a direct voltage converter 133 between the direct voltage link 138 and the chargeable battery system 132. The direct voltage converter 133 is advantageously controllable so that the direct voltage $V_{DC}$ of the direct voltage link 138 can be kept substantially constant even if the voltage of the chargeable battery system 132 were changing. Furthermore, the vessel 126 may comprise an inverter 136 for converting the direct voltage $V_{DC}$ of the direct voltage link 138 into one or more alternating voltages suitable for an alternating voltage system 134 of the vessel.

In the exemplifying case illustrated in FIG. 1, the above-mentioned control signal is transferred from the vessel 126 to the electric power system on the shore-side with the aid of a radio link. In this exemplifying case, the transmitter 128 of the vessel 126 comprises a radio transmitter and the control system 108 on the shore-side comprises a radio receiver. It is, however, also possible that the control signal is transferred from the vessel 126 to the electric power system on the shore-side with the aid of an electric signal cable or an optical fiber. The control signal can be an analog signal, and the control system 108 can be configured to be responsive to the level, frequency, phase, and/or other properties of the control signal. It is also possible that the control signal is a digital signal. In exemplifying cases where the control signal is a digital signal, the transmitter 128 of the vessel comprises a modulator and the receiver of the control system 108 comprises a corresponding demodulator so as to enable the transfer of the digital control signal from the vessel 126 to the electric power system on the shore-side.

In an electric power system according to an exemplifying and non-limiting embodiment of the invention, the control system 108 comprises a communication protocol processor 125 for controlling the reception of the control signal in accordance with one or more digital data transfer protocols. Correspondingly, the transmitter 128 of the vessel 126 comprises a communication protocol processor 129 for controlling the transmission of the control signal in accordance with the one or more digital data transfer protocols. The one or more digital data transfer protocols may comprise for example the Internet Protocol "IP", Ethernet protocol, the Asynchronous Transfer Mode "ATM" protocol, and/or the MultiProtocol Label Switching "MPLS".

The exemplifying electric power system illustrated in FIG. 1 comprises capacitive energy-storages 113 and 114. The capacitive energy-storage 113 is connected to the direct voltage terminals of the controllable converters 101-104, and the capacitive energy-storage 114 is connected to the direct voltage terminals of the controllable converters 109-112. Each of the capacitive energy storages 113 and 114 may comprise for example one or more electric double layer capacitors "EDLC" which can be called also "super capacitors".

In the exemplifying electric power system illustrated in FIG. 1, the direct voltage link 106 comprises an over-current protector 115 and the direct voltage link 107 comprises an over-current protector 116. Each over-current protector can be for example a fuse or an over-current protector relay or another protector circuit breaker.

The exemplifying electric power system illustrated in FIG. 1 comprises a transformer 117 for connecting the controllable converters 101-104 to the shore-side alternating voltage network 137, and another transformer 118 for connecting the controllable converters 109-112 to the shore-side alternating voltage network 137. Each of the transformers comprises a three-phase primary winding for being connected to the shore-side alternating voltage network 137 and four three-phase secondary windings each being connected to a respective one of the controllable converters. In FIG. 1, the three-phase primary winding of the transformer 117 is denoted with a reference 119 and two of the three-phase secondary windings of the transformer 117 are denoted with references 120 and 121.

The exemplifying electric power system illustrated in FIG. 1 comprises supply breakers 122, 123, and 124 for interrupting the electric power supply from the shore-side alternating voltage network 137 to the controllable converters 101-104 and/or to the controllable converters 109-112. The supply breakers can be controlled e.g. by the control system 108 so that the electric power supply from the shore-side alternating voltage network 137 to the controllable converters 101-104 and/or 109-112 is interrupted in response to a fault situation in the controllable converters 101-104 and/or 109-112.

Figure 2:
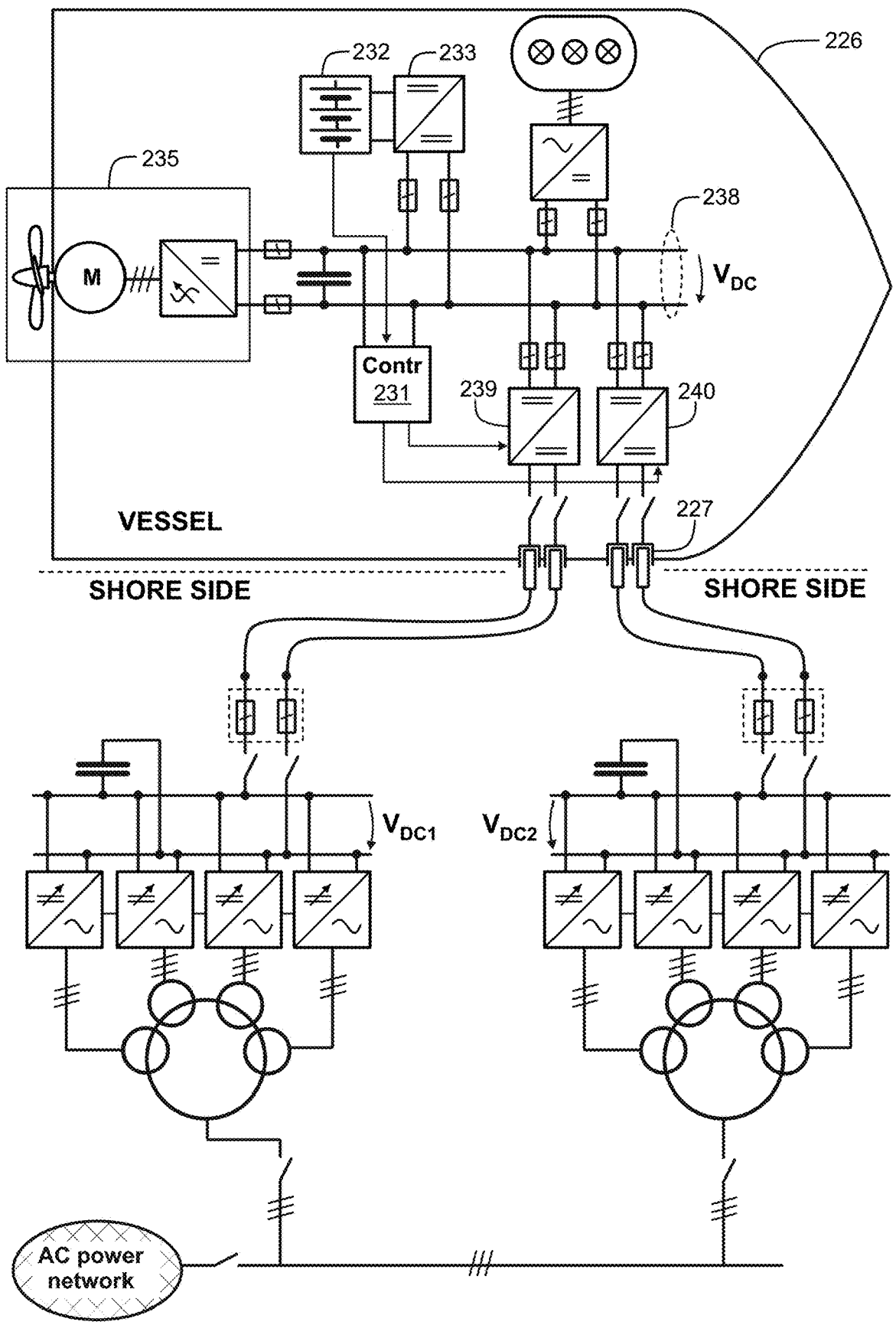
FIG. 2 shows a schematic illustration of a vessel according to an exemplifying and non-limiting embodiment of the invention.

FIG. 2 shows a schematic illustration of a vessel 226 according to an exemplifying and non-limiting embodiment of the invention. The vessel 226 comprises electric connectors for receiving direct voltages $V_{DC1}$ and $V_{DC2}$ from a shore-side electric power system. In FIG. 2, one of the electric connectors is denoted with a reference 227. The vessel 226 comprises controllable direct voltage converters 239 and 240, and a control system 231 for controlling the direct voltage converters 239 and 240 so that the received direct voltages $V_{DC1}$ and $V_{DC2}$ are converted to be suitable for the vessel 226. Each of the direct voltage converters 239 and 240 can be for example a buck and/or boost converter. Usually, a buck and/or boost converter can be arranged to support a broad input voltage range more cost effectively than is a case with a controllable rectifier for converting alternating voltage into controllable direct voltage.

The vessel 226 is an electric vessel that comprises a chargeable battery system 232 for receiving charging energy from the electric connectors of the vessel and for supplying electric power to a propulsion system 235 of the vessel. The control system 231 can be configured to control the direct voltage converters 239 and 240 in accordance with e.g. the state of charge of the chargeable battery system 232 and/or in accordance with other information such as e.g. one or more predetermined control parameters. A control parameter may indicate for example a reference value for direct voltage $V_{DC}$ of a direct voltage link 238 of the vessel 226. In the exemplifying case illustrated in FIG. 2, the vessel comprises a direct voltage converter 233 between the direct voltage link 238 and the chargeable battery system 232. The direct voltage converter 233 is advantageously controllable so that the direct voltage $V_{DC}$ of the direct voltage link 238 can be kept substantially constant even if the voltage of the chargeable battery system 232 were changing.

Each of the above-mentioned control systems 131, 108, and 231 can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, each of the above-mentioned control systems may comprise one or more memory circuits such as e.g. a Random Access Memory "RAM" circuit.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An electric power system for supplying one or more direct voltages from shore-side to a vessel, the electric power system comprising:

one or more controllable converters configured to receive the electric power from a shore-side alternating voltage network and to produce the one or more direct voltages;

at least one transformer configured to connect the one or more controllable converters to the shore-side alternating voltage network, the at least one transformer comprising a primary winding for being connected to the shore-side alternating voltage network, and a plurality of secondary windings each being connected to a corresponding one of the controllable converters, electric connectors configured to connect an electric circuitry of the vessel;

one or more direct voltage links configured to transfer the one or more direct voltages from the one or more controllable converters to the electric connectors; and a control system configured to receive a control signal from the vessel and to directly control the one or more controllable converters in accordance with the received control signal to control the one or more direct voltages to be transferred from the electric connectors to the electric circuitry of the vessel.

2. The electric power system according to claim 1, wherein the electric power system further comprises one or more capacitive energy storages connected to direct voltage terminals of the one or more controllable converters.

3. The electric power system according to claim 2, wherein each of the one or more capacitive energy storages comprises one or more electric double layer capacitors.

4. The electric power system according to claim 1, wherein each of the one or more direct voltage links comprises one or more over-current protectors.

5. The electric power system according to claim 4, wherein at least one of the over-current protectors is a fuse.

6. The electric power system according to claim 1, wherein the electric power system further comprises one or more supply breakers configured to break supply of the electric power from the shore-side alternating voltage network to one or more of the controllable converters.

7. The electric power system according to claim 1, wherein the control system comprises a communication protocol processor configured to control the reception of the control signal in accordance with one or more digital data transfer protocols.

8. The electric power system according to claim 7, wherein the one or more digital data transfer protocols comprises at least one of the following: Internet Protocol, Ethernet protocol, Asynchronous Transfer Mode protocol, and MultiProtocol Label Switching.

9. The electric power system according to claim 1, wherein the control system comprises a radio receiver configured to receive the control signal from the vessel.

* * * * *